United States Patent [19]

Asada et al.

[11] Patent Number: 5,664,861

[45] Date of Patent: Sep. 9, 1997

[54] LIGHT CONDUCTIVE PLATE AND PLANE ILLUMINATING APPARATUS USING THE SAME

[75] Inventors: Yasuhiro Asada; Kiichi Emori, both of Tokyo, Japan

[73] Assignee: Colcoat Co., Ltd., Tokyo, Japan

[21] Appl. No.: 386,667

[22] Filed: Feb. 10, 1995

[30] Foreign Application Priority Data

Feb. 10, 1994 [JP] Japan .................................. 6-016595

[51] Int. Cl.$^6$ .................................................. F21V 7/04
[52] U.S. Cl. .................. 362/31; 362/27; 362/330; 362/800
[58] Field of Search .................. 362/26, 27, 31, 362/328, 329, 330, 800

[56] References Cited

U.S. PATENT DOCUMENTS 5,130,898  7/1992  Akahane ........................ 362/31
5,450,292  9/1995  Yokoyama et al. ............ 362/26 X

FOREIGN PATENT DOCUMENTS

5-224019  9/1993  Japan .

Primary Examiner—Stephen F. Husar
Attorney, Agent, or Firm—Oblon, Spivak, McClelland, Maier & Neustadt, P.C.

[57] ABSTRACT

A light conductive plate used in a side light source type plane illuminating apparatus having a light source arranged on one side portion of a transparent light conductive plate, has a dimming pattern composed of a plurality of curves provided on the back of said light conductive plate. Portions of each of the curves of the dimming pattern located nearer the edge near a light source extend substantially perpendicular to the edge and portions of each of the curves of the dimming pattern located farther from the edge near a light source extend substantially parallel to the edge.

13 Claims, 7 Drawing Sheets

FIG. 5 PRIOR ART
LUMINANCE CHARCTERISTICS OF LIGHT CONDUCTIVE PLATE
FIRST EMBODIMENT

FIG. 6 PRIOR ART

LIGHT SOURCE

LIGHT CONDUCTIVE PLATE AND PLANE ILLUMINATING APPARATUS USING THE SAME

BACKGROUND OF THE INVENTION

1. Field of the Invention

The present invention relates to a light conductive plate for a plane illuminating apparatus used as a back light in liquid crystal display devices such as a personal computer, a word processor, a telephone and the like. The present invention further relates to a liquid crystal image display device using the illuminating apparatus.

2. Description of the Related Art

In a side light source type plane illuminating apparatus, which is commonly called edge lighting, a transparent light conductive plate has a light reflecting surface on the back thereof, and a dimming pattern intended to evenly diffuse the light emitted from the light emitting surface is applied to either surface of the light conductive plate. This prevents uneven luminance, in which the portion of the emitting surface near the light source is brighter, and the portion of the emitting surface far away from the light source is darker.

Figures 6, 7:
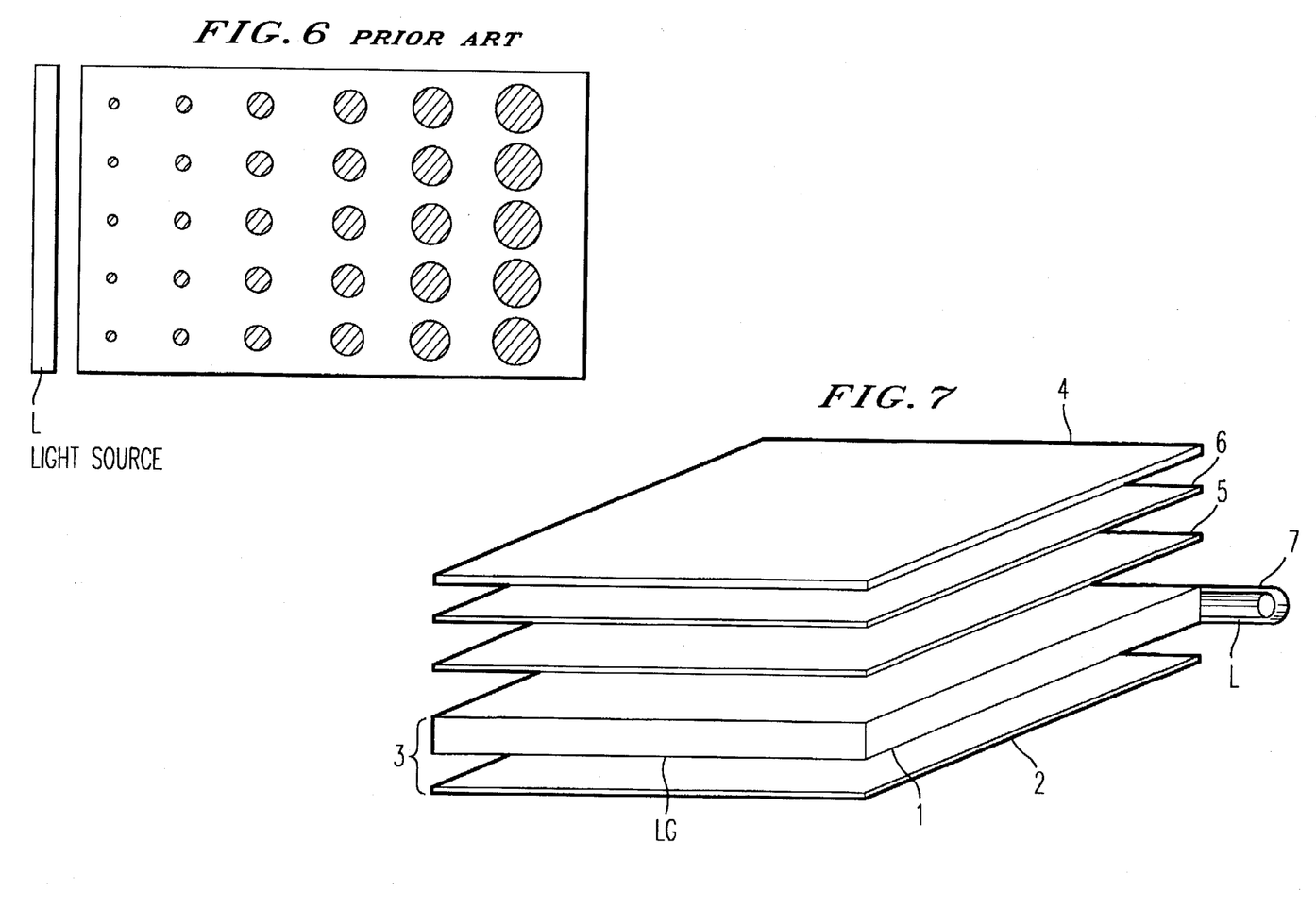
FIG. 6 is a plan view showing a conventional dimming pattern.
FIG. 7 is a perspective view similar to FIG. 4 but with a constant thickness light conductive plate.

A typical dimming pattern is shown in FIG. 6 (dot gradation printing). The dimming pattern is there composed of a plurality of circular disturbing reflecting surfaces of different sizes on the back of the transparent conductive plate. Those farther away from the light source L are larger so that the area of the reflected light increases with distance from the light source. In other proposals, a concave portion or a convex portion may be provided on the back of the light conductive plate, and the depth or height thereof may be successively increased (Japanese Patent Laid-Open No. 5-224019 and Japanese Utility Model Laid-open No. 5-697829).

The design wherein a concave portion or a convex portion is provided on the surface of the light conductive plate, and the density, size or like characteristic thereof is gradually changed to control a degree of reflection and dimming with respect to an incoming light so that it is uniformly emitted, is difficult to design and produce. In the system making use of control of incident light by a dot gradation printing (FIG. 6), the design and production are relatively easy but this system has a drawback in that the producing process comprises two steps, i.e. molding and printing. In addition, a sufficient luminance is not obtained.

SUMMARY OF THE INVENTION

It is an object of the present invention to solve the problems noted above with respect to the conventional devices.

It is another object of the present invention to provide a light conductive plate which provides a uniform luminance without unevenness on the emitting surface of the light conductive plate, thereby maximizing the luminance.

It is another object of the present invention to provide a light conductive plate which is simple in design and method of production.

It is yet another object of the present invention to provide a plane illuminating apparatus using the light conductive plate and a liquid crystal image display device making use of the plane illuminating apparatus.

According to the present invention, a light conductive plate in an illuminating apparatus having a light source arranged at a side portion of a transparent light conductive plate, comprising a light conductive plate part having an edge adjacent a light source of an illuminating apparatus and a dimming pattern composed of a plurality of curves provided on one surface of said light conductive plate part. Portions of each of said curves of said dimming pattern located nearer said edge near a light source extend substantially perpendicular to said edge and portions of each of said curves of said dimming pattern located farther from the edge near a light source extend substantially parallel to said edge.

The present invention further provides a light conductive plate in an illuminating apparatus having a light source arranged at a side portion of a transparent light conductive plate, comprising a light conductive plate part having an edge adjacent a light source of an illuminating apparatus and a dimming pattern composed of a plurality of curves provided on one surface of said light conductive plate part. The dimming pattern is composed of a plurality of curves having center points or origin points which are substantially equally spaced along a straight line or a circle.

The present invention still further provides a side light source type plane illuminating apparatus comprising a light source, a light conductive plate having an edge adjacent the light source, and a dimming pattern composed of a plurality of curves provided on one surface of said light conductive plate. The dimming pattern curve is composed of one of printing, a concave portion and a convex portion. The dimming pattern is composed of a plurality of curves having center points or origin points which are substantially equally spaced along a straight line or a circle.

The present invention further provides a liquid crystal image display device comprising, a liquid crystal display panel, a light source, a light conductive plate positioned for illuminating said liquid crystal display panel from a back thereof and having an edge adjacent the light source, and a dimming pattern composed of a plurality of curves provided on one surface of said light conductive plate. The dimming pattern curve is composed of one of printing, a concave portion and a convex portion. The dimming pattern is composed of a plurality of curves having center points or origin points which are substantially equally spaced along a straight line or a circle. A light diffusing plate is arranged between said liquid crystal panel and said light conductive plate, said dimming pattern being formed on a surface of said light conductive plate opposite said light diffusing plate. A light reflecting surface is formed on said surface of said light conductive plate opposite said light diffusing plate.

A characteristic of the present invention lies in a pattern provided on the back of the transparent light conductive plate. The pattern is intended as follows:

The positional relationship between the curvature of a pattern curve, a pitch, a center or an original point present on a straight line or a circle, is selected with respect to an effective display surface of the light conductive plate whereby an area ratio between an area of a pattern forming portion and the remaining plane is changed continuously from low to high density in a suitable proportion in accordance with the distance from the light source.

The portions of the curve constituting the pattern located close to the edge nearest the light source are substantially transverse to the light source, and become substantially parallel thereto as the curve moves away from the single light source or a linear light source composed of a plurality of light-emitting optical points disposed on the straight line. This means that where the luminous flux of the same density is incident on an inclined plane of a concave portion or a convex portion constituting the pattern curve, the density of luminous flux per unit area of the inclined plane is small in the vicinity of the light source while it becomes high away from the light source.

Near the light source, the light is incident at a shallow angle with respect to the inclined plane of the pattern and a component of the reflecting light which reflects toward the portion away from the light source increases. On the other hand, at a position away from the light source, the light is incident on the inclined plane at a deep angle (an angle close to a right angle) and a component (a dimming portion) of the reflecting light directly emitted from the emitting surface increases. As a result, the emitting quantity from the emitting surface close to the light source can be equalized with the emitting quantity from the far emitting surface.

When the light source is on a straight line, the center point or the original point of the circular curve or the higher degree curve constituting the pattern preferably stands on the straight line. When the light source is a L-letter like form, it is preferably designed so that the center point stands on a circle intersecting the corner of the L shape.

The pattern curve thus formed is present at an angle close to perpendicular to the edge in the vicinity of the light source even when the light source is L-letter like form to minimize the reflectance in the vicinity of the light source so that the luminance on the illuminating surface can be made uniform.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein.

DESCRIPTION OF THE PREFERRED EMBODIMENTS

Embodiments of the present invention will be described in detail hereinbelow with reference to the drawings.

Figure 1:
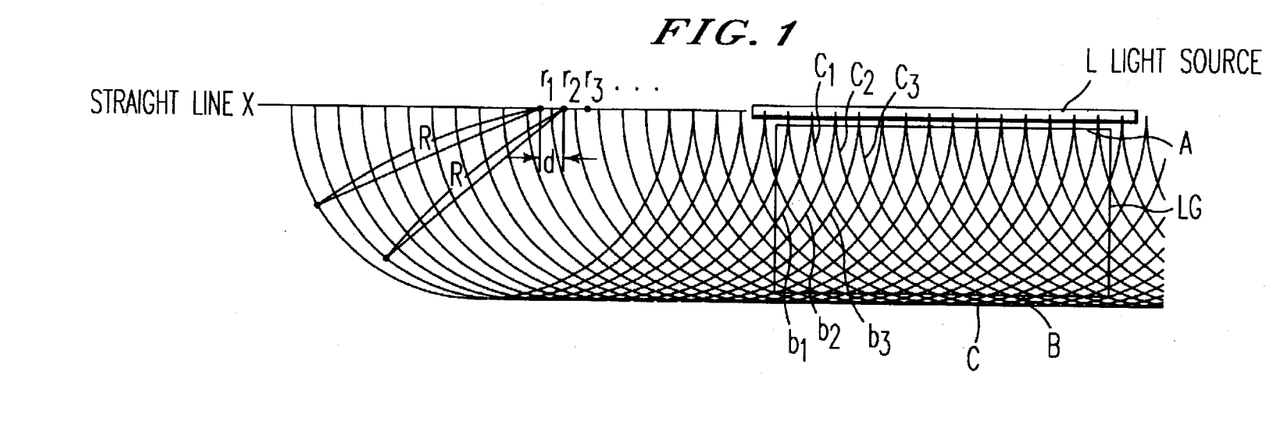
FIG. 1 is a schematic plan view showing a transparent light conductive plate provided with a dimming pattern according to an embodiment of the present invention.

FIG. 1 schematically illustrates an example of a curve pattern according to one embodiment of the present invention. FIG. 1 shows a curve pattern in which a plurality of circles having a radius R are defined about a number of center points r1, r2, r3, etc. arranged at fixed constant intervals d on a straight line X. Such a curve pattern is formed by (concave) grooves or raised (convex) portions on the surface of a transparent light conductive plate LG having one edge A near the line X and the light source 1, and another edge B which is farther from the line X and the light source L. That is, on the light conductive plate LG are formed circular V-shaped grooves defining curves b1, b2, b3, etc., and circular curves c1, c2, c3, etc. intersecting the curves b1, b2, b3, etc. These grooves reflect and diffuse light emitted from the light source L. As will be apparent from the drawing, the pattern density is low at the near edge A while the pattern density is high near the far edge B. Moreover, each of the circular curves is substantially perpendicular to the light source L in the vicinity of the near edge A whereas it is substantially parallel to the light source L in the vicinity of the far edge B.

Little of the light emitted from the light source L is reflected and diffused by the V-shaped grooves near the edge A because of the low groove density and because the curves are substantially perpendicular to the light source L (parallel to the light emitting direction) in the vicinity of the near edge A. On the other hand, the emitted light is intersects the V-shaped grooves at a sharp angle near the far edge B where the curves are substantially parallel to the light source L (perpendicular to the light emitting direction) in the vicinity of the far edge B of the light conductive plate LG. Accordingly, the light reflection increases and the light dimming effect becomes high. In this manner, the dimming effect increases as the light moves from the near edge A toward the far edge B and, since the light intensity inversely decreases as the light moves from the near edge A toward the far edge B, uniform luminosity for the light conductive plate can thereby be achieved.

The terms "substantially perpendicular" and "substantially parallel" herein used mean more or less "close to perpendicular" and "close to parallel," and not a strict precision as may be measured by a protractor. These terms should be flexibly interpreted corresponding to various factors such as uses and object, area, thickness of the transparent conductive plate, dimensions of a difference in level of the concave portion and convex portion, and are mere terms used as one means which represents the change progressively from the near edge to the far edge of the light conductive plate. Accordingly, it should be interpreted that "perpendicular" and "parallel" are sometimes in the range of angles from about 20° to 40°.

The radius R of the circles varies with the size of the light illuminating apparatus. In the case of a light conductive plate for a normal liquid crystal panel with a width between the near and far edges of about 2 to 8 inches (about 50 mm to 200 mm), the radius is preferably in the range of from 50 to 120 mm. The center spacing d between the circular curves varies depending on the depth of the grooves or the height (difference in level) of the convex portion, and the length of the light conductive distance. Preferably, the spacing d is in the range of from about 0.3 to 2.0 mm at the position of the center points (r1, r2, r3, etc.).

Figure 2:
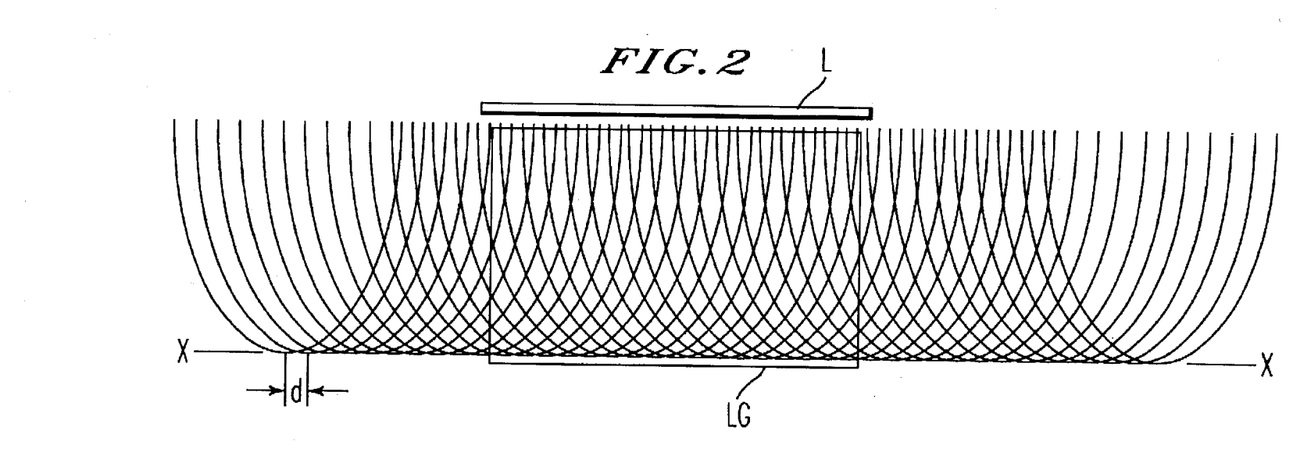
FIG. 2 is a schematic plan view showing a transparent light conductive plate provided with a dimming pattern according to a further embodiment of the present invention.

FIG. 2 shows a second embodiment of the present invention using a second order curve in place of a circular curve. In this embodiment, the apexes of a number of second order curves are arranged at fixed distance d along a straight line X—X adjacent the edge of the plate LG farthest from the light source L. Accordingly, the origin points of the second order curves are also on a straight line. Since the shape of the secondary curves can be freely changed by varying the coefficient "a" in the equation:

$Y=aX^2$, this embodiment is suitable for the design of a pattern in the case where a circular curve is not successful in providing uniform luminance.

Figure 3:
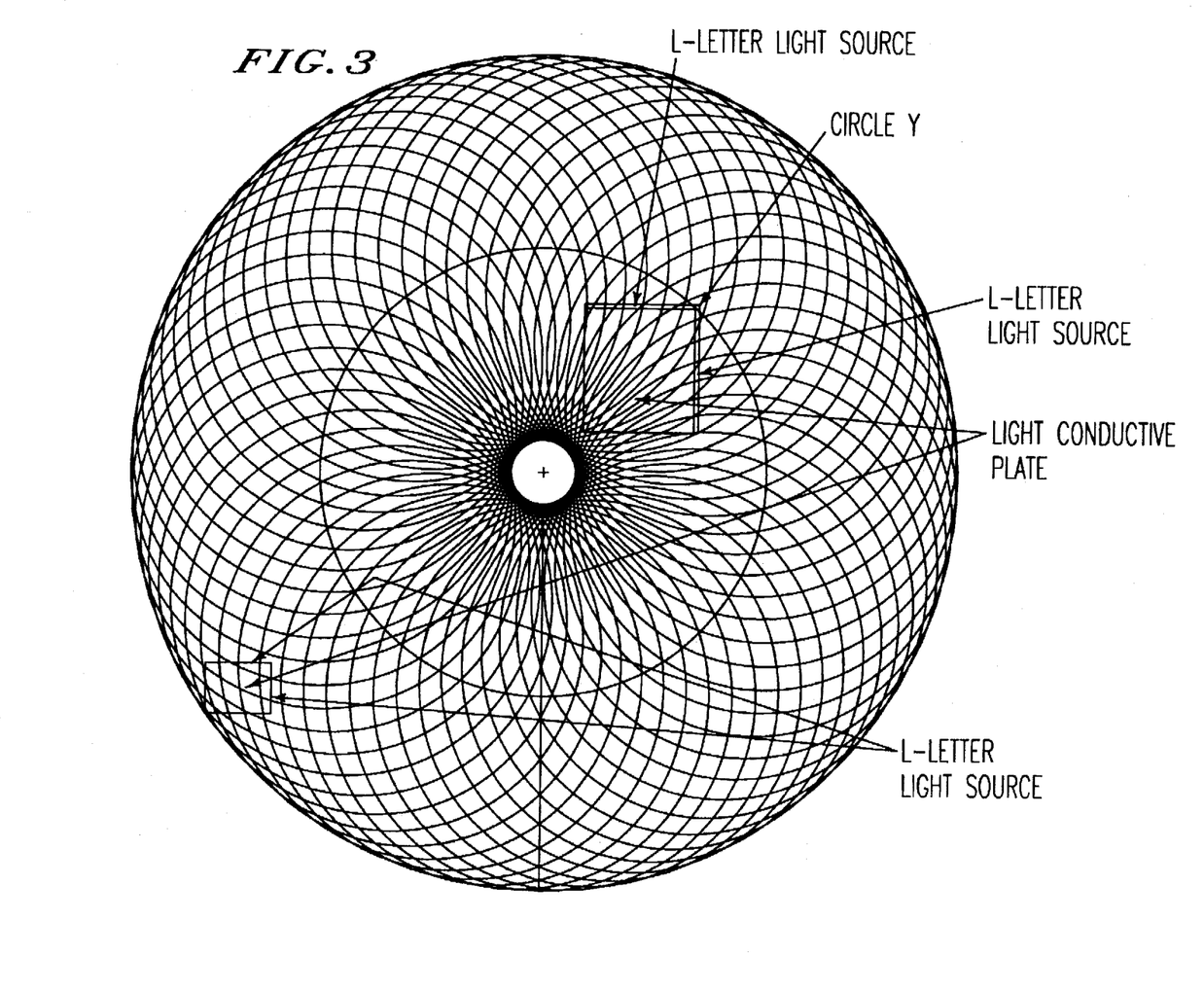
FIG. 3 is a schematic plan view of a light conductive plate provided with a dimming pattern when an L-letter like light source is used according to another embodiment of the present invention.

FIG. 3 shows an embodiment in which the light source is in an L-shape, and a dimming pattern is designed using circular curves with center points on the circle Y to produce a pattern which is widely spaced at the near edge of the light conductive plate and is dense toward the far edge opposed thereto.

A pattern which is widely spaced at the near edge of the light conductive plate and is dense toward the far edge opposed thereto may employ, in addition to circles or second order curves as mentioned in connection with the first and second embodiments, respectively, third or higher order curves. In the case where a pattern is formed by a cutting process, circles or second order curves are suitably employed.

For mass production of light conductive plates having a present dimming pattern curve, it is preferable to use an injection molding process.

Figure 8A:
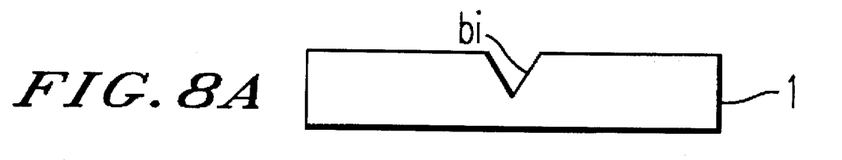
FIGS. 8a–8f are a cross-sectional view of the light conductive plate according to the present invention.
Figure 8B:
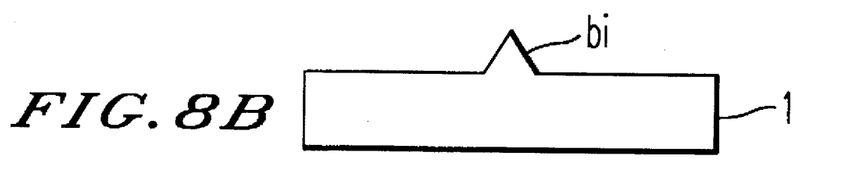
Figure 8C:
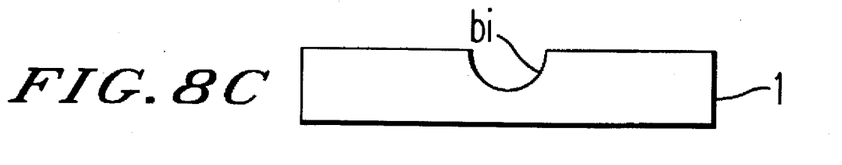
Figure 8D:
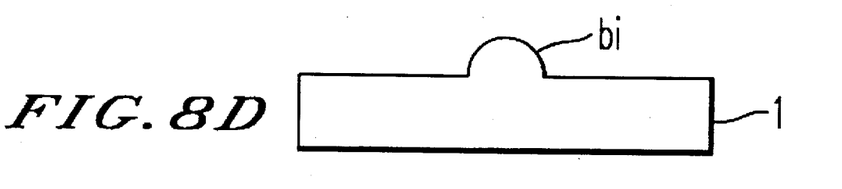
Figure 8E:
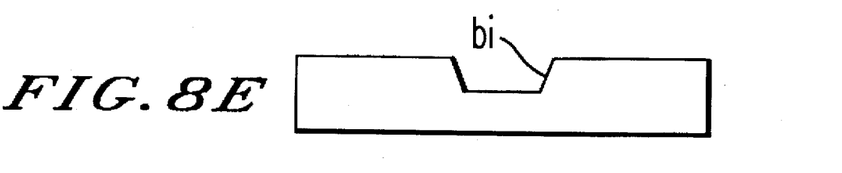
Figure 8F:
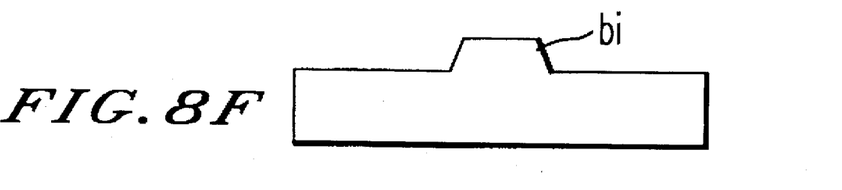

The pattern of curves, as seen in section, may have any of suitable concave or convex sectional shapes. Various shapes such as a V-shape, an angular shape, a semispherical shape, a polygonal shape and the like can be used. FIGS. 8a–8f show examples of curves in cross section. FIGS. 8a and 8b show V-shaped curves while FIGS. 8c and 8d show semispherical-shaped curves. FIGS. 8e and 8f show angular shaped curves. Any pattern can be produced by injection molding making use of a mold. A concave V-shape can be made by cutting, wherein the reflecting angle and the sectional shape are easily controlled. The depth of a concave portion (a groove) or the height of a convex portion is preferably about 0.01 to 0.5 mm.

It is possible to continuously change the depth of a concave portion (a groove) or the height of a convex portion, when necessary. When the depth is changed, preferably, the depth is made deeper as the groove is farther from the light source to improve the dimming efficiency. The inner surface of a concave portion or the outer surface of a convex portion can be formed as a coarse surface such as aventurine. The patterns in the embodiments described above may be formed making use of translucent or white ink or the like by a printing method. A vacuum vapor deposition method, a sand blast method, and a photoetching method may be also used.

Figure 4:
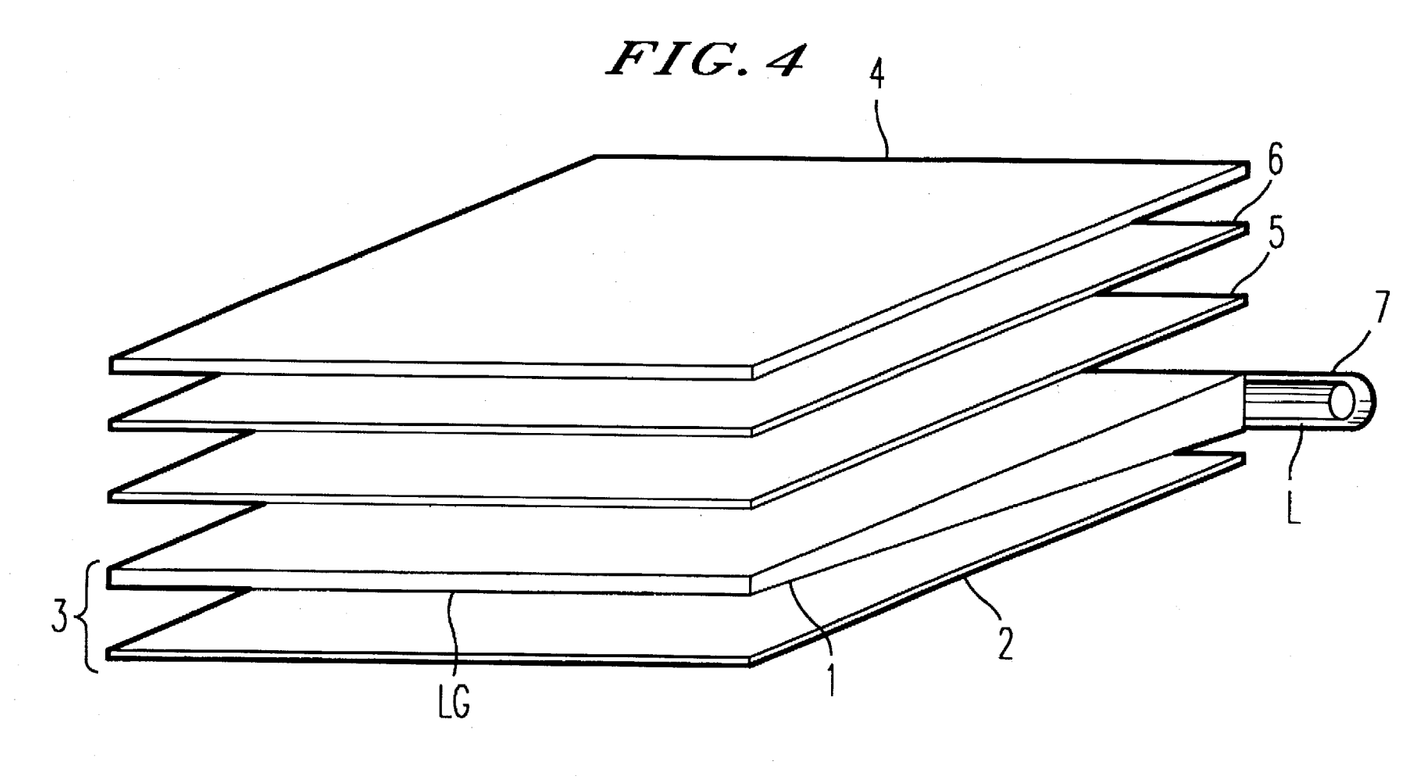
FIG. 4 is a perspective view showing a construction of a plane illuminating apparatus and a liquid crystal image display device according to the present invention.

The light conductive plate may have a constant thickness, as shown in FIG. 7, or may have a wedge-like shape which becomes thinner with greater distance from the light source, as shown in FIG. 4. In the case of the plate having a constant thickness, it is preferable that a light reflecting surface is provided on the far edge, i.e., that opposed to the edge nearest the light source side. In the case of the wedge shape, the reflecting surface on the far edge is not always necessary, and the weight of the light conductive plate itself can be reduced.

Materials which may be used for the transparent light conductive plate include transparent plastics such as acrylic resin, polycarbonate, CR-39, polystyrene. The acrylic resin is particularly preferable in terms of high transparency and scratch resistance. The size of the light conductive plate may be any size, but when it is used as a back light for a liquid crystal panel, the length of a diagonal line is normally about 2 to 10 inches.

In a plane illuminating apparatus 3 using the light conductive plate LG of the present invention shown in FIG. 4, the light from the light source L is incident on the concave portion or convex pattern on the back 1 of the light conductive plate LG, and is thereby reflected. Part of the reflected light directly moves toward the emitting surface of the light conductive plate or the other concave portion or convex portion, but some light passes through the back surface 1 and is lost. In order to prevent light from passing through the back 1 of the light conductive plate and be lost, a separate reflecting sheet 2 is arranged close to the back of the light conductive plate. An aluminum vapor deposition sheet or a white light diffusion sheet may be used as the reflecting sheet.

All of the pattern provided on the light transmitting plate need not be used as the effective surface of the light conductive apparatus. For example, at the end of the pattern opposed to the light source, a portion several millimeter to scores of millimeters from a common tangential line (for example, line C in FIG. 1) of the pattern can be made to serve as the effective illuminating end.

The liquid crystal image display device using the plane illuminating apparatus according to the present invention is basically composed of a liquid crystal display panel 4, a light diffusion sheet 5, and a plane illuminating device 3. A prism plate 6 can be provided between the liquid crystal display panel 4 and the light diffusion sheet 5 to enhance the luminance at an angle of view only in the specific direction of view. This prism plate 6 may be arranged in its prism surface on the side of the diffusion plate or arranged on the side opposite thereto. A lenticular lens sheet can be used in place of the prism plate.

Next, a specific example of the present invention will be described with reference to FIGS. 1 and 4. A pattern of the transparent light conductive plate as used in the first embodiment is composed of a plurality of semicircles. The radius of the circles is about 90 mm, and the spacing between the circular curves is about 1.6 mm at the center point. Each of circles constituting the pattern is composed of a convex portion (a groove portion), whose section has a V shape with a vertex angle of 90° and a height of which is initially about 0.05 to 0.15 mm and becomes continuously deeper as it moves farther away from the light source.

A fluorescent tube L as a light source is arranged along the near edge A, and is covered with a semi-circular reflecting sheet 7 in order to improve the efficiency of illumination. The light conductive plate LG, which corresponds to a 4-inch display plate, has a size of about 85×70 mm, a thickness of about 4 mm at the end on the light source side and about 1 mm at the opposite end, and a wedge shape. The effective illuminating surface terminates about 10 mm inwardly from the common tangential line C of the pattern curve.

Figure 9:
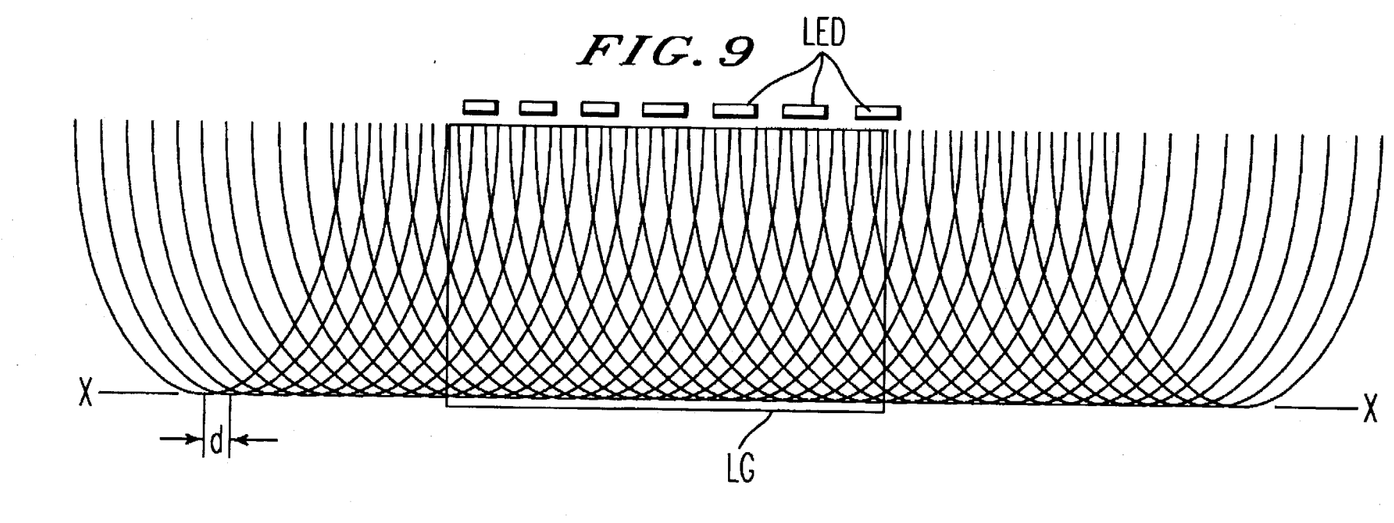
FIG. 9 is a perspective view similar to FIG. 2 but using LED light sources.

The light source may also be in the form of a plurality of light emitting diodes, as indicated in FIG. 9.

Figure 5:
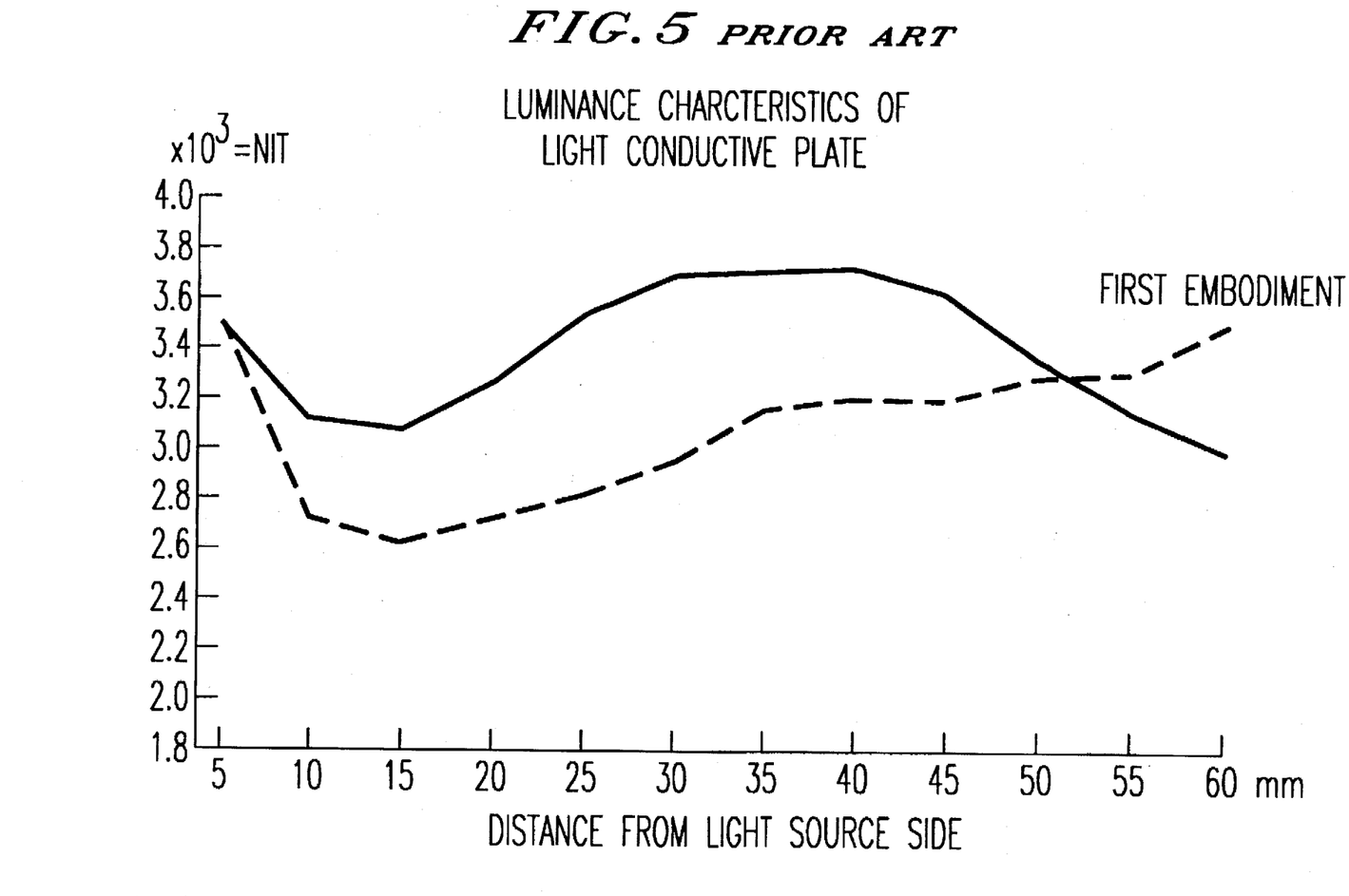
FIG. 5 is a graph comparing a distribution of luminance of the light conductive plate in the embodiment shown in FIG. 1 to a conventional plate.

The luminance of the emitting surface of the light conductive plate in the apparatus as described above was examined, the result of which is shown in FIG. 5 and the Table 1 below. It was found that there is some unevenness in luminance according to the distance from the light source but that the luminance is remarkably even as compared with the conventional devices, achieving a uniform luminance at a high level of about 3410 nit.

TABLE 1

| Dist. From Light(mm) | First Embodiment | Conventional Device |
|---|---|---|
| 5 | 3520 nit | 3520 nit |
| 10 | 3120 nit | 2730 nit |
| 15 | 3080 nit | 2640 nit |
| 20 | 3270 nit | 2730 nit |
| 25 | 3540 nit | 2820 nit |
| 30 | 3710 nit | 2960 nit |
| 35 | 3730 nit | 3160 nit |
| 40 | 3750 nit | 3220 nit |
| 45 | 3650 nit | 3210 nit |
| 50 | 3380 nit | 3300 nit |
| 55 | 3160 nit | 3330 nit |
| 60 | 3010 nit | 3520 nit |
| Average | 3410 nit | 3095 nit |

The conventional pattern shown in FIG. 6 was formed on the back of the transparent light conductive plate of the same size by gradation printing of white ink to prepare a plane illuminating apparatus, while equally setting other optical conditions. The luminance of the emitting surface of this illuminating apparatus is as shown in FIG. 5 and Table 1.

The average luminance is about 3095 nit, which is lower by 10% on the average than that of the specific example of the present invention.

According to the present invention, it is easy to mechanically adjust many parameters such as the radius of the circle, curvature of the curve, pitch of the center point, depth and height of concave and convex portions, sectional shape and the like. The luminance is high. It is easy to design a dimming pattern excellent in uniformity. It is possible to easily produce a light conductive plate as designed. As a result, it is possible to easily and inexpensively provide an illuminating apparatus which is not only high in luminance but also high in uniformity.

Obviously, numerous modifications and variations of the present invention are possible in light of the above teachings. It is therefore to be understood that the invention may be practiced otherwise than as specifically described herein.

What is claimed as new and is desired to be secured by Letters Patent of the United States is:

1. A light conductive plate in an illuminating apparatus having a light source arranged at a side portion of a transparent light conductive plate, comprising:

a light conductive plate part having an edge adjacent a light source of an illuminating apparatus;

a dimming pattern composed of a plurality of curves provided on one surface of said light conductive plate part, wherein portions of each of said curves of said dimming pattern located nearer said edge near a light source extend substantially perpendicular to said edge and portions of each of said curves of said dimming pattern located farther from the edge near a light source extend substantially parallel to said edge.

2. A light conductive plate in an illuminating apparatus having a light source arranged at a side portion of a transparent light conductive plate, comprising:

a light conductive plate part having an edge adjacent a light source of an illuminating apparatus;

a dimming pattern composed of a plurality of curves provided on one surface of said light conductive plate part, wherein said dimming pattern is composed of a plurality of intersecting curves having center points or origin points which are substantially equally spaced along a straight line or a circle, wherein a number of points of intersection of said curves increases with distance away from said edge.

3. The light conductive plate according to claim 2, wherein the dimming pattern curve is composed of one of a concave portion and a convex portion.

4. The light conductive plate according to claim 2, wherein the light source is a fluorescent light tube arranged substantially parallel with said edge adjacent the light source.

5. The light conductive plate according to claim 2, wherein the shape of said edge adjacent the light source is similar to that of the fluorescent light tube.

6. The light conductive plate according to claim 2, wherein the light source is at least one LED.

7. The light conductive plate according to claim 3, wherein the sectional shapes of the portion forming said dimming pattern curves are one of V-shape, angular shape and semi-circular shape.

8. The light conductive plate according to claim 3, wherein the portions of said dimming pattern curves nearer said edge have a spacing of about 0.3 to 2.0 mm and a height or depth of about 0.01 to 0.5 mm.

9. The light conductive plate according to claim 2, wherein the thickness of said light conductive plate gradually decreases with distance away from said edge.

10. The light conductive plate according to claim 2, wherein the thickness of said light conductive plate is substantially constant.

11. A side light source type plane illuminating apparatus comprising:

a light source;

a light conductive plate having an edge adjacent the light source;

a dimming pattern composed of a plurality of curves provided on one surface of said light conductive plate, wherein the dimming pattern curve is composed of one of printing, a concave portion and a convex portion, and wherein said dimming pattern is composed of a plurality of intersecting curves having center points or origin points which are substantially equally spaced along a straight line or a circle, wherein a number of points of intersection of said curves increases with distance away from said edge.

12. The light conductive plate according to claim 11 wherein said light source is an L shaped light source and said edge adjacent said light source comprises two edges.

13. A liquid crystal image display device comprising:

a liquid crystal display panel;

a light source;

a light conductive plate positioned for illuminating said liquid crystal display panel from a back thereof and having an edge adjacent the light source;

a dimming pattern composed of a plurality of curves provided on one surface of said light conductive plate, wherein the dimming pattern curve is composed of one of printing, a concave portion and a convex portion, and wherein said dimming pattern is composed of a plurality of intersecting curves having center points or origin points which are substantially equally spaced along a straight line or a circle, wherein a number of points of intersection of said curves increases with distance away from said edge;

a light diffusing plate arranged between said liquid crystal display panel and said light conductive plate, said dimming pattern being formed on a surface of said light conductive plate opposite said light diffusing plate; and a light reflecting surface on said surface of said light conductive plate opposite said light diffusing plate.

* * * * *